(12) United States Patent
Doong et al.

(10) Patent No.: US 9,517,431 B2
(45) Date of Patent: Dec. 13, 2016

(54) METHOD FOR SMOOTHING TIME-VARYING CONCENTRATION OF A FLUID STREAM

(71) Applicant: UOP LLC, Des Plaines, IL (US)

(72) Inventors: Shain-Jer Doong, Kildeer, IL (US); Christopher B. McIlroy, Park Ridge, IL (US)

(73) Assignee: UOP LLC, Des Plaines, IL (US)

( * ) Notice: Subject to any disclaimer, the term of this patent is extended or adjusted under 35 U.S.C. 154(b) by 275 days.

(21) Appl. No.: 14/492,386

(22) Filed: Sep. 22, 2014

(65) Prior Publication Data

US 2016/0082382 A1 Mar. 24, 2016

(51) Int. Cl.
*B01D 53/02* (2006.01)
*B01D 53/04* (2006.01)
*C10L 3/10* (2006.01)
*B01D 53/047* (2006.01)

(52) U.S. Cl.
CPC ............... *B01D 53/04* (2013.01); *C10L 3/101* (2013.01); *C10L 3/103* (2013.01); *C10L 3/104* (2013.01); *B01D 53/0476* (2013.01); *B01D 2256/24* (2013.01); *B01D 2256/245* (2013.01); *B01D 2257/304* (2013.01); *B01D 2257/306* (2013.01); *B01D 2257/308* (2013.01); *B01D 2257/504* (2013.01); *B01D 2257/602* (2013.01); *B01D 2257/702* (2013.01); *B01D 2257/80* (2013.01); *B01D 2259/4009* (2013.01); *B01D 2259/40086* (2013.01); *C10L 3/106* (2013.01); *C10L 2290/08* (2013.01); *C10L 2290/12* (2013.01); *C10L 2290/542* (2013.01); *C10L 2290/58* (2013.01)

(58) Field of Classification Search
CPC ..................... B01D 2256/24; B01D 2256/245; B01D 2257/304; B01D 2257/306; B01D 2257/308; B01D 2257/504; B01D 2257/602; B01D 2257/702; B01D 2257/80; B01D 2259/40086; B01D 2259/4009; B01D 53/04; B01D 53/0476; C10L 2290/08; C10L 2290/12; C10L 2290/542; C10L 2290/58; C10L 3/101; C10L 3/103; C10L 3/104; C10L 3/106
See application file for complete search history.

(56) References Cited

U.S. PATENT DOCUMENTS

| 2,581,135 A | * | 1/1952 | Odell | B01D 53/48 422/146 |
|---|---|---|---|---|
| 3,149,920 A | * | 9/1964 | Urban | C01B 17/0434 422/619 |
| 5,089,034 A | | 2/1992 | Markovs | |
| 5,348,921 A | * | 9/1994 | Bissett | C01B 17/52 423/230 |

(Continued)

FOREIGN PATENT DOCUMENTS

JP 2010024340 A 2/2010

*Primary Examiner* — Christopher P Jones

(57) ABSTRACT

A process for reducing the size of sulfur removal units is presented. The process includes passing a regeneration gas from a regenerated contaminant adsorption unit through a fixed bed adsorber. The fixed bed adsorber adsorbs sulfur compounds above an equilibrium condition and releases adsorbed sulfur compounds below the equilibrium condition. The peak levels of sulfur in the regeneration gas are reduced and the processing of the regeneration gas reduces the size of sulfur removal units.

19 Claims, 2 Drawing Sheets

(56) References Cited

U.S. PATENT DOCUMENTS

| | | |
|---|---|---|
| 5,626,033 A | 5/1997 | Tamhankar |
| 8,206,669 B2 | 6/2012 | Schaffer |
| 8,454,727 B2 | 6/2013 | Dunne |
| 8,518,356 B2 | 8/2013 | Schaffer |
| 8,814,984 B2 | 8/2014 | McIlroy |
| 2002/0023538 A1* | 2/2002 | Agarwal ................ B01D 53/12 95/108 |

* cited by examiner

METHOD FOR SMOOTHING TIME-VARYING CONCENTRATION OF A FLUID STREAM

FIELD OF THE INVENTION

The field of the invention pertains to contaminant removal. In particular, the invention controls the rate of contaminant concentrations in a process stream for downstream removal.

BACKGROUND

Natural gas is an important resource as a fuel and is becoming an important resource for upgrading to higher molecular weight hydrocarbons. Natural gas must be treated to meet pipeline or LNG (liquefied natural gas) specifications before transporting to either an end user for combustion as a fuel or to a processing plant for conversion to higher molecular weight hydrocarbons. Natural gas contains a substantial amount of impurities, or contaminants, that require removal. The contaminants include carbon dioxide, water, sulfur compounds, and even some heavy metals, such as mercury.

Processes for treating natural gas are known, and include solvent based systems and molecular sieve based systems. However, the composition of a natural gas stream fluctuates over time, and the amount of contaminants also varies over time. The process of treating natural gas includes designing equipment for treating peak flows of contaminants. This leads to excessive amounts of solvents, and to oversized equipment for the treatment of natural gas.

The improvement in processes for treating natural gas can reduce the cost and energy in generating a natural gas stream that meets pipeline or LNG specifications.

SUMMARY

Natural gas needs to be cleaned of contaminants to meet pipeline or LNG specifications before it can be transported to end users. The clean up process involves several stages and each is designed according to expected peak values of the contaminants. Controlling the contaminant levels removed from the natural gas stream can reduce costs and equipment size. The present invention provides for that control of contaminant levels.

A first embodiment of the invention is a process for removing sulfur compounds from a natural gas stream comprising passing a natural gas feed stream to an acid gas removal unit to generate a partially sweetened natural gas stream and an acid gas stream; passing the partially sweetened natural gas stream to an adsorption unit for adsorbing water and sulfur compounds to generate a treated natural gas stream; passing a regenerator gas stream to the adsorption unit to generate a regen gas enriched with sulfur compounds; passing the regen gas enriched with sulfur compounds to a fixed-bed adsorber to generate a regen gas effluent stream with a reduced level of peak sulfur concentration; and passing the regen gas with the reduced level of peak sulfur compounds to a sulfur removal unit. An embodiment of the invention is one, any or all of prior embodiments in this paragraph up through the first embodiment in this paragraph wherein the fixed-bed adsorber adsorbs sulfur compounds from the regen gas above an equilibrium adsorption concentration, and desorbs sulfur compounds from the adsorbent below the equilibrium adsorption concentration. An embodiment of the invention is one, any or all of prior embodiments in this paragraph up through the first embodiment in this paragraph wherein the fixed-bed adsorber adsorbs hydrocarbon compounds from the regen gas above an equilibrium adsorption concentration, and desorbs hydrocarbon compounds from the adsorbent below the equilibrium adsorption concentration. An embodiment of the invention is one, any or all of prior embodiments in this paragraph up through the first embodiment in this paragraph further comprising passing the treated natural gas stream to a natural gas liquids recovery unit to generate a treated gas stream, a C2 stream, a C3 stream, and a C4 stream. An embodiment of the invention is one, any or all of prior embodiments in this paragraph up through the first embodiment in this paragraph further comprising passing the C3 stream to a mercaptan treater to generate a treated C3 stream; passing a regen gas to the mercaptan treater to generate a sulfur enriched regen gas; passing the sulfur enriched regen gas to the fixed-bed adsorber to generate a regen gas with a reduced level of peak sulfur compounds; and passing the regen gas with the reduced level of peak sulfur compounds to the sulfur removal unit. An embodiment of the invention is one, any or all of prior embodiments in this paragraph up through the first embodiment in this paragraph further comprising passing the C4 stream to a mercaptan treater to generate a treated C4 stream; passing a regen gas to the mercaptan treater to generate a sulfur enriched regen gas; passing the sulfur enriched regen gas to the fixed-bed adsorber to generate a regen gas with a reduced level of peak sulfur compounds; and passing the regen gas with the reduced level of peak sulfur compounds to the sulfur removal unit. An embodiment of the invention is one, any or all of prior embodiments in this paragraph up through the first embodiment in this paragraph further comprising passing the acid gas to a sulfur recovery unit. An embodiment of the invention is one, any or all of prior embodiments in this paragraph up through the first embodiment in this paragraph wherein the sulfur removal unit generates a second acid gas stream and a fuel stream, further comprising passing the second acid gas stream to a second sulfur selective adsorber to generate a reduced sulfur acid gas stream; and passing the reduced sulfur acid gas stream to a sulfur recovery unit. An embodiment of the invention is one, any or all of prior embodiments in this paragraph up through the first embodiment in this paragraph further comprising testing the sulfur level in the regenerator gas stream before passing the regenerator gas stream to the fixed-bed adsorber; splitting the regenerator gas stream into a first portion and a second portion when the sulfur level in the regenerator gas stream is below a preselected value; passing the first portion to the fixed-bed adsorber to generate the regen gas effluent stream; and combining the second portion with the regen gas effluent stream to generate a combined stream. An embodiment of the invention is one, any or all of prior embodiments in this paragraph up through the first embodiment in this paragraph further comprising passing the combined stream to the sulfur removal unit.

A second embodiment of the invention is a process for removing sulfur compounds from a natural gas stream comprising passing the natural gas stream to an acid gas removal unit to generate a first stream comprising sulfur compounds, and a second stream comprising natural gas with reduced sulfur compounds; passing the second stream to a gas treatment unit to generate a treated gas stream; passing a regenerator gas stream to the gas treatment unit to generate a regen gas enriched with sulfur compounds; splitting the regen gas into two portions, and passing a first portion to a fixed bed adsorption unit, having an adsorbent, to generate an adsorber effluent gas with a reduced level of peak sulfur concentration, wherein the adsorption unit adsorbs sulfur compounds when the sulfur compound concentration in the regen gas is above an equilibrium concentration and desorbs sulfur compounds when the sulfur compound concentration in the regen gas is below the equilibrium concentration; combining the adsorber effluent gas with a second portion of the regen gas to form a combined stream; and passing the combined stream to a sulfur removal unit, to generate a second acid gas stream, and a sweet gas stream. An embodiment of the invention is one, any or all of prior embodiments in this paragraph up through the second embodiment in this paragraph wherein the first portion is between 1% and 99% of the regen gas, and wherein the first portion can be adjusted to a preset level. An embodiment of the invention is one, any or all of prior embodiments in this paragraph up through the second embodiment in this paragraph wherein the gas treatment unit comprises passing the second stream to a dehydration and a mercury (Hg) removal unit to generate a third stream comprising a dried natural gas; and passing the third stream to a natural gas liquids recovery unit to generate the treated gas stream, a fourth stream comprising C4 and higher hydrocarbons, a fifth stream comprising C3 hydrocarbons, and a sixth stream comprising C2 hydrocarbons. An embodiment of the invention is one, any or all of prior embodiments in this paragraph up through the second embodiment in this paragraph further comprising passing the fourth stream to an RSH treater to generate a clean C4 stream; and periodically passing a regen gas to the RSH treater to generate a first used regen gas. An embodiment of the invention is one, any or all of prior embodiments in this paragraph up through the second embodiment in this paragraph further comprising combining the first used regen gas with the first portion of the first regen effluent gas and to form a combined first regen gas and passing the combined first regen gas to the adsorption unit. An embodiment of the invention is one, any or all of prior embodiments in this paragraph up through the second embodiment in this paragraph further comprising passing the first used regen gas to the acid gas removal unit. An embodiment of the invention is one, any or all of prior embodiments in this paragraph up through the second embodiment in this paragraph further comprising passing the fifth stream to a second RSH treater to generate a clean C3 stream; and periodically passing a regen gas to the second RSH treater to generate a second used regen gas. An embodiment of the invention is one, any or all of prior embodiments in this paragraph up through the second embodiment in this paragraph further comprising combining the second used regen gas with the first portion of the first regen effluent gas and to form a combined first regen gas and passing the combined first regen gas to the adsorption unit. An embodiment of the invention is one, any or all of prior embodiments in this paragraph up through the second embodiment in this paragraph further comprising passing the second used regen gas to the acid gas removal unit. An embodiment of the invention is one, any or all of prior embodiments in this paragraph up through the second embodiment in this paragraph further comprising passing the acid gas stream to a sulfur recovery unit.

Other objects, advantages and applications of the present invention will become apparent to those skilled in the art from the following detailed description and drawings.

DETAILED DESCRIPTION

Figure 1:
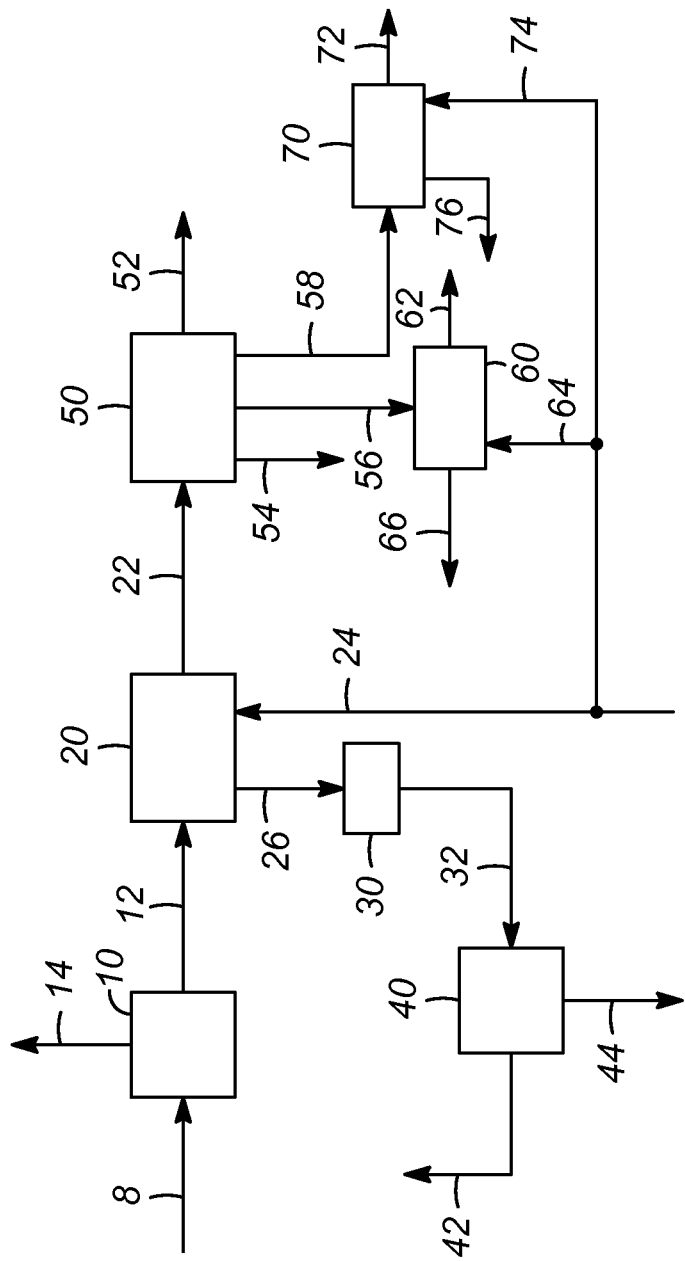
FIG. 1 is a diagram of one embodiment of the present process.

A natural gas stream needs to be treated to remove contaminants and to provide for a composition that meets specifications for transport in a pipeline or liquefied natural gas (LNG). The specifications are to protect the pipeline or liquefaction equipment, as well as to remove lower valued materials that reduce the value of the sale gas.

A basic natural gas treatment includes a process unit for removing acid gas components, a process unit for removing water, and a process unit for the removal of natural gas liquids.

At least one of the process steps involves an adsorption process. Adsorption processes have been widely used in industries for gas or liquid separation or purification. When a fluid stream enters a fixed bed adsorber, the components that are more strongly adsorbed will be retained by the adsorbent, and those less strongly adsorbed components will pass through the adsorber, resulting in separation of the fluid components. In practice, the adsorption process is dynamic in nature, as the feed to the adsorber has to be stopped after a certain period of time when the adsorber is saturated with the strongly adsorbed components. Typically, the unit includes multiple adsorber beds where at least one adsorber bed is off-line to be regenerated, while the other adsorber beds remain on-stream. The off-line adsorber would then go to a regeneration phase by reducing the fluid pressure, passing a purge gas or raising the bed temperature by passing a hot regeneration gas. As a result, the adsorbed components will desorb, leaving the adsorber along with the regeneration/purge gas. The amounts of the desorbed components in the effluent regeneration stream tend to vary with time, generating a peak in the concentration profile of the regeneration gas. If the effluent regeneration gas needs to be processed in a downstream unit, the peak concentration profile can make these downstream units larger than an equivalent stream with a constant concentration. In some cases, the fluctuation of stream compositions can results in unstable operation for those downstream units.

As an example, in a natural gas processing complex, a molecular sieve unit is typically used to remove water and organic sulfur compounds in an integrated gas purification complex. The molecular sieve unit is periodically regenerated. The regeneration involves passing a regeneration gas through the molecular sieve unit. The regeneration gas from the molecular sieve unit is then sent to a physical solvent process to further remove the organic sulfur compounds from the regeneration gas by absorbing the sulfur compounds in the solvent. A peak sulfur concentration in the gas stream will mean a sulfur absorption unit with a design to remove the maximum sulfur composition in the feed, including an increase in the amount of solvent required. Furthermore, the rich solvent after the gas absorption will also fluctuate in its sulfur composition, following a similar profile to the regeneration gas sulfur content. The rich solvent is then regenerated in a stripper column to release the sulfur compounds in an acid gas stream. The sulfur-laden acid gas is typically sent to a sulfur recovery unit to recover the sulfur compounds. The acid gas will have a time-varying composition similar to the rich solvent and the feed gas, notably with a peak profile as mentioned earlier. The non-uniform feed composition to the sulfur recovery unit can result in reduced sulfur recovery efficiency, insufficient conversion, rapid catalyst deactivation, and other issues.

Current commercial solution uses two rich solvent tanks to alternate filling the tanks during the peak and non-peak times, and then blending the outlet of the two tanks to provide a constant sulfur concentration for the rich solvent. As the tanks need to be able to hold a quantity of the circulating solvent for a time period of the molecular sieve regeneration step, typically 2 to 3 hrs, the sizes of the tanks become quite large.

The present invention provides a method to even out the concentration peak generated from the regeneration stream of a cyclic adsorption process such as TSA (Temperature Swing Adsorption) or PSA (Pressure Swing Adsorption) process. The process, as shown in FIG. 1, is a process for removing contaminants from a natural gas stream. A natural gas stream 8 is passed to an acid gas removal unit 10 to generate a partially sweetened natural gas stream 12 and an acid gas stream 14. The partially sweetened natural gas stream 12 is passed to an adsorption unit 20 for adsorbing water, organic sulfur compounds, metals and other contaminants, to generate a treated natural gas stream 22.

The adsorption unit 20 is periodically regenerated to remove the adsorbed contaminants. This can involve transferring the sweetened natural gas stream 12 to a second adsorption bed and taking the spent adsorption bed off-line. A regenerator gas 24 is passed to the adsorption unit 20 to generate a regen gas 26 having sulfur compounds and other contaminants. The regen gas 26 is passed to a fixed bed adsorber 30 to generate a regen gas 32 with a reduced level of peak sulfur concentration. The regen gas with reduced peak sulfur 32 is passed to a sulfur removal unit 40 to generate a second acid gas stream 42 and a fuel gas stream 44.

The fixed bed adsorber 30 includes an adsorbent that adsorbs sulfur compounds from the regen gas 26 when the sulfur compound concentration in the regen gas 26 is above an equilibrium adsorption concentration, and desorbs sulfur compounds from the adsorbent when the sulfur compound concentration in the regen gas 26 is below the equilibrium adsorption concentration. The fixed-bed adsorber acts like a capacitor and provides for a smoothing of the sulfur concentration in the regen gas 32 passed to the sulfur removal unit 40. The process reduces the amount of solvent required for the sulfur removal unit 40 and reduces swings in operation of the sulfur removal unit 40.

In an alternative, the present invention can include a process for smoothing the concentration of hydrocarbon compounds carried in the regen gas 26. The fixed bed adsorber 30 can include an adsorbent that adsorbs hydrocarbons above an equilibrium composition in the regen gas 26. The fixed bed adsorber 30 can include an adsorbent that adsorbs sulfur compounds and hydrocarbons, or can include two, or more, adsorbents for moderating the peak levels of different compounds. In particular, it would be advantageous to select appropriate adsorbents for particular classes of compounds, such as organic sulfur compounds, and to use multiple adsorbents when there are multiple classes of compounds to have the peaks levels moderated.

The acid gas 14 includes compounds removed from the natural gas stream such as hydrogen sulfide (H2S), carbon dioxide (CO2) and carbonyl sulfide (COS). The acid gas removal unit 10 can also remove other compounds that are soluble in amine solutions. The acid gas stream 14 is passed to a sulfur recovery unit (not shown). A sulfur recovery unit for processing acid gas streams is known to those skilled in the art and is not further described herein.

The adsorption unit 20 comprises an adsorbent for removing contaminants that are not removed in the acid gas removal unit 10, as well as drying the natural gas stream.

The process can further include passing the treated natural gas stream 22 to a natural gas liquids (NGL) recovery unit 50. The natural gas liquids recovery unit 50 will separate out the various gas components that can condense in the pipeline. The NGL recovery unit 50 will generate a treated gas stream 52 to meet pipeline or liquefied natural gas (LNG) specifications, a C2 stream 54, a C3 stream 56 and a C4 stream 58. The C4 stream 58 can include small amounts of heavier hydrocarbons.

The process can further include passing the C3 stream 56 to a mercaptan treater 60 to generate a treated C3 stream 62 with reduced organic sulfur compounds. The mercaptan treater 60 is an adsorption unit for adsorbing organic sulfur compounds, of which the primary compounds include mercaptans. The mercaptan treater 60 is periodically regenerated with a regen gas stream 64 to regenerate the adsorbent and generates a sulfur enriched spent regen gas 66. The spent regen gas 66 can be passed to the fixed bed adsorber 30 to generate a spent regen gas with a reduced peak level of sulfur compounds, and the spent regen gas with reduced peak sulfur can be passed to the sulfur removal unit 40. As an alternative, when the levels of sulfur in the regen gas are low, the spent regen gas can be passed recycled back to the acid gas removal unit 10.

The process can further include passing the C4 stream 58 to a second mercaptan treater 70 to generate a treated C4 stream 72 with reduced organic sulfur compounds. The second mercaptan treater 70 is periodically regenerated with a regen gas stream 74 to regenerate the adsorbent and generates a sulfur enriched spent regen gas 76. The spent regen gas 76 can be passed to the fixed bed adsorber 30 to generate a spent regen gas with a reduced peak level of sulfur compounds, and the spent regen gas with reduced peak sulfur can be passed to the sulfur removal unit 40. As an alternative, when the levels of sulfur in the regen gas are low, the spent regen gas can be recycled back to the acid gas removal unit 10.

The sulfur removal unit 40 generates a second acid gas stream 42 and a fuel stream 44. In an alternative, the second acid gas stream 42 can be passed to a second selective fixed bed adsorber to generate an acid gas stream with a reduced peak sulfur concentration, and the acid gas stream with the reduced peak sulfur concentration is passed to the sulfur recovery unit. This reduces the swings in sulfur concentrations passed to the sulfur recovery unit.

Figure 2:
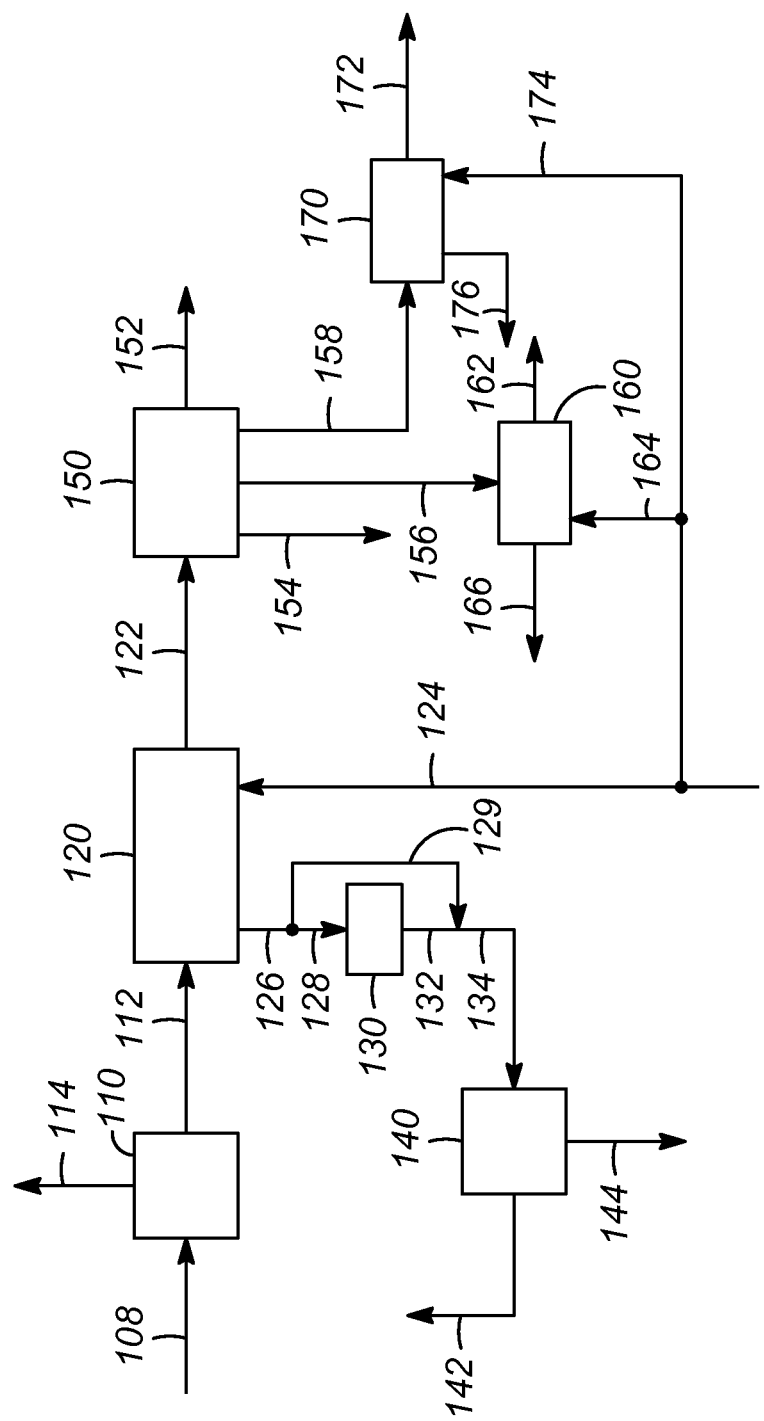
FIG. 2 is a diagram of a second embodiment of the present process.

In an alternative, the process allows for a preset manual control for the removal of sulfur compounds from a natural gas stream. The process, as shown in FIG. 2, includes passing a natural gas stream 108 to an acid gas removal unit 110 to generate a first stream 114 comprising sulfur compounds, and a second stream 112 comprising natural gas with reduced sulfur compounds. The second stream 112 is passed to a gas treatment unit 120 to generate a treated gas stream 122. The first stream 114, also known as an acid gas stream, is passed to a sulfur recovery unit.

The gas treatment unit 120 is periodically regenerated to remove the adsorbed contaminants. A regenerator gas 124 is passed to the gas treatment unit 120 to generate a regen gas 126 having sulfur compounds and other contaminants. The regen gas stream 126 is split into a first portion 128 and a second portion 129. The first portion 128 is passed to a fixed bed adsorption unit 130 having an adsorbent to generate an adsorber effluent gas 132 with a reduced level of peak sulfur concentration. The adsorbent in the adsorption unit 130 adsorbs sulfur compounds when the sulfur compound concentration in the regen gas 128 is above an equilibrium concentration and desorbs sulfur compounds when the sulfur compound concentration in the regen gas 128 is below the equilibrium concentration. The adsorber effluent gas 132 is combined with the second portion 129 of the regen gas to form a combined stream 134. The combined stream 134 is passed to a sulfur removal unit 140 to generate a second acid gas stream 142 and a sweet gas fuel stream 144.

The process includes splitting the regen gas stream 126 into a first portion 128 that is between 1% and 99% of the regen gas stream 126. This split can be adjusted to a preset level. The option of only reducing the peak level in a portion of the regen gas stream allows for reducing the size of the fixed bed adsorption unit 130, as balanced against the size of the sulfur removal unit 140 and solvent needs associated with the sulfur removal unit 140. As an example, with a very intermittent peak flow of sulfur compounds, the size of the adsorber could be reduced by approximately half by splitting the regen gas in approximately equal portions with the combined stream resulting in a peak level of approximately half that of the regen gas 126 as it exits the gas treatment unit 120.

The gas treatment unit 120 utilizes an adsorbent for dehydration of the gas stream and for the removal of metals such as mercury (Hg) and organic sulfur compounds. The gas treatment unit 120 generates the third stream 122 and passes the third stream to a natural gas liquids recovery unit 150 to generate a treated gas stream 152, a fourth stream 158 comprising C4 and higher hydrocarbons, a fifth stream 156 comprising C3 hydrocarbons and a sixth stream 154 comprising C2 hydrocarbons.

The fourth stream 158 can be passed to an RSH treater 170 to generate a clean C4 stream 172. An RSH treater is an adsorber for removing residual mercaptans. The RSH treater 170 is periodically regenerated with passing of a regen gas 174 to the RSH treater 170 to generate a first used regen gas 176. Optionally, the first used regen gas 176 can be combined with the first portion 128 of the first regen effluent gas 126 to form a combined stream. The combined stream can be passed to the fixed bed adsorption unit 130 to reduce the peak sulfur concentration. In an alternate embodiment, the first used regen gas 176 can be passed to the acid gas removal unit.

The fifth stream 156 can be passed to a second RSH treater 160 to generate a clean C3 stream 162. The second RSH treater 160 is periodically regenerated with passing of a regen gas 164 to the second RSH treater 160 to generate a second used regen gas 166. Optionally, the second used regen gas 166 can be combined with the first portion 128 of the first regen effluent gas 126 to form a combined stream. The combined stream can be passed to the fixed bed adsorption unit 130 to reduce the peak sulfur concentration. In an alternate embodiment, the second used regen gas 166 can be passed to the acid gas removal unit.

In an alternate embodiment, the regen gas stream 126 can be sampled for sulfur content. Testing the sulfur level in the regen gas stream 126 can be used for controlling the splitting of the regen gas stream 126 into a first portion and a second portion, when the sulfur level in the regen gas stream is below a preselected value. The first portion can be passed through a sulfur compound selective fixed bed adsorber to generate a regen effluent stream with reduced peak sulfur. The regen effluent stream is combined with the second portion to form a combined stream. The combined stream is passed to a sulfur removal unit to generate an acid gas stream and a fuel gas stream with low sulfur content.

While the invention has been described with what are presently considered the preferred embodiments, it is to be understood that the invention is not limited to the disclosed embodiments, but it is intended to cover various modifications and equivalent arrangements included within the scope of the appended claims.

What is claimed is:

1. A process for removing sulfur compounds from a natural gas stream comprising:
   passing a natural gas feed stream to an acid gas removal unit to generate a partially sweetened natural gas stream and an acid gas stream;
   passing the partially sweetened natural gas stream to an adsorption unit for adsorbing water and sulfur compounds to generate a treated natural gas stream;
   passing a regenerator gas stream to the adsorption unit to generate a regen gas enriched with sulfur compounds;
   passing the regen gas enriched with sulfur compounds to a fixed-bed adsorber to generate a regen gas effluent stream with a reduced level of peak sulfur concentration; and
   passing the regen gas with the reduced level of peak sulfur compounds to a sulfur removal unit.

2. The process of claim 1 wherein the fixed-bed adsorber adsorbs sulfur compounds from the regen gas above an equilibrium adsorption concentration, and desorbs sulfur compounds from the adsorbent below the equilibrium adsorption concentration.

3. The process of claim 1 wherein the fixed-bed adsorber adsorbs hydrocarbon compounds from the regen gas above an equilibrium adsorption concentration, and desorbs hydrocarbon compounds from the adsorbent below the equilibrium adsorption concentration.

4. The process of claim 1 further comprising passing the treated natural gas stream to a natural gas liquids recovery unit to generate a treated gas stream, a C2 stream, a C3 stream, and a C4 stream.

5. The process of claim 4 further comprising:
   passing the C3 stream to a mercaptan treater to generate a treated C3 stream;
   passing a regen gas to the mercaptan treater to generate a sulfur enriched regen gas;
   passing the sulfur enriched regen gas to the fixed-bed adsorber to generate a regen gas with a reduced level of peak sulfur compounds; and
   passing the regen gas with the reduced level of peak sulfur compounds to the sulfur removal unit.

6. The process of claim 4 further comprising:
   passing the C4 stream to a mercaptan treater to generate a treated C4 stream;
   passing a regen gas to the mercaptan treater to generate a sulfur enriched regen gas;
   passing the sulfur enriched regen gas to the fixed-bed adsorber to generate a regen gas with a reduced level of peak sulfur compounds; and
   passing the regen gas with the reduced level of peak sulfur compounds to the sulfur removal unit.

7. The process of claim 1 further comprising passing the acid gas to a sulfur recovery unit.

8. The process of claim 1 wherein the sulfur removal unit generates a second acid gas stream and a fuel stream, further comprising:
   passing the second acid gas stream to a second fixed-bed adsorber to generate a reduced level of peak sulfur acid gas stream; and
   passing the reduced level of peak sulfur acid gas stream to a sulfur recovery unit.

9. The process of claim 1 further comprising:
testing the sulfur level in the regenerator gas stream before passing the regenerator gas stream to the fixed-bed adsorber;
splitting the regenerator gas stream into a first portion and a second portion when the sulfur level in the regenerator gas stream is below a preselected value;
passing the first portion to the fixed-bed adsorber to generate the regen gas effluent stream; and
combining the second portion with the regen gas effluent stream to generate a combined stream.

10. The process of claim 9 further comprising passing the combined stream to the sulfur removal unit.

11. A process for removing sulfur compounds from a natural gas stream comprising:
passing the natural gas stream to an acid gas removal unit to generate a first stream comprising sulfur compounds, and a second stream comprising natural gas with reduced sulfur compounds;
passing the second stream to a gas treatment unit to generate a treated gas stream;
passing a regenerator gas stream to the gas treatment unit to generate a regen gas comprising sulfur compounds;
splitting the regen gas into two portions, and passing a first portion to a fixed bed adsorption unit, having an adsorbent, to generate an adsorber effluent gas with a reduced level of peak sulfur concentration, wherein the adsorption unit adsorbs sulfur compounds when the sulfur compound concentration in the regen gas is above an equilibrium concentration and desorbs sulfur compounds when the sulfur compound concentration in the regen gas is below the equilibrium concentration;
combining the adsorber effluent gas with a second portion of the regen gas to form a combined stream; and
passing the combined stream to a sulfur removal unit, to generate a second acid gas stream, and a sweet gas stream.

12. The process of claim 11 wherein the first portion is between 1% and 99% of the regen gas, and wherein the first portion can be adjusted to a preset level.

13. The process of claim 11 wherein the gas treatment unit comprises:
passing the second stream to a dehydration and a mercury (Hg) removal unit to generate a third stream comprising a dried natural gas; and
passing the third stream to a natural gas liquids recovery unit to generate the treated gas stream, a fourth stream comprising C4 and higher hydrocarbons, a fifth stream comprising C3 hydrocarbons, and a sixth stream comprising C2 hydrocarbons.

14. The process of claim 13 further comprising:
passing the fourth stream to an RSH treater to generate a clean C4 stream; and
periodically passing a regen gas to the RSH treater to generate a first used regen gas.

15. The process of claim 14 further comprising combining the first used regen gas with the first portion of the first regen effluent gas and to form a combined first regen gas and passing the combined first regen gas to the fixed-bed adsorption unit.

16. The process of claim 14 further comprising passing the first used regen gas to the acid gas removal unit.

17. The process of claim 13 further comprising:
passing the fifth stream to a second RSH treater to generate a clean C3 stream; and
periodically passing a regen gas to the second RSH treater to generate a second used regen gas.

18. The process of claim 17 further comprising combining the second used regen gas with the first portion of the first regen effluent gas and to form a combined first regen gas and passing the combined first regen gas to the fixed-bed adsorption unit.

19. The process of claim 18 further comprising passing the second used regen gas to the acid gas removal unit.

* * * * *